July 4, 1961     H. D. MAYS ET AL     2,990,953
MACHINE FOR DETECTING CRACKED CERAMIC TILES
Filed Oct. 21, 1958     3 Sheets-Sheet 1
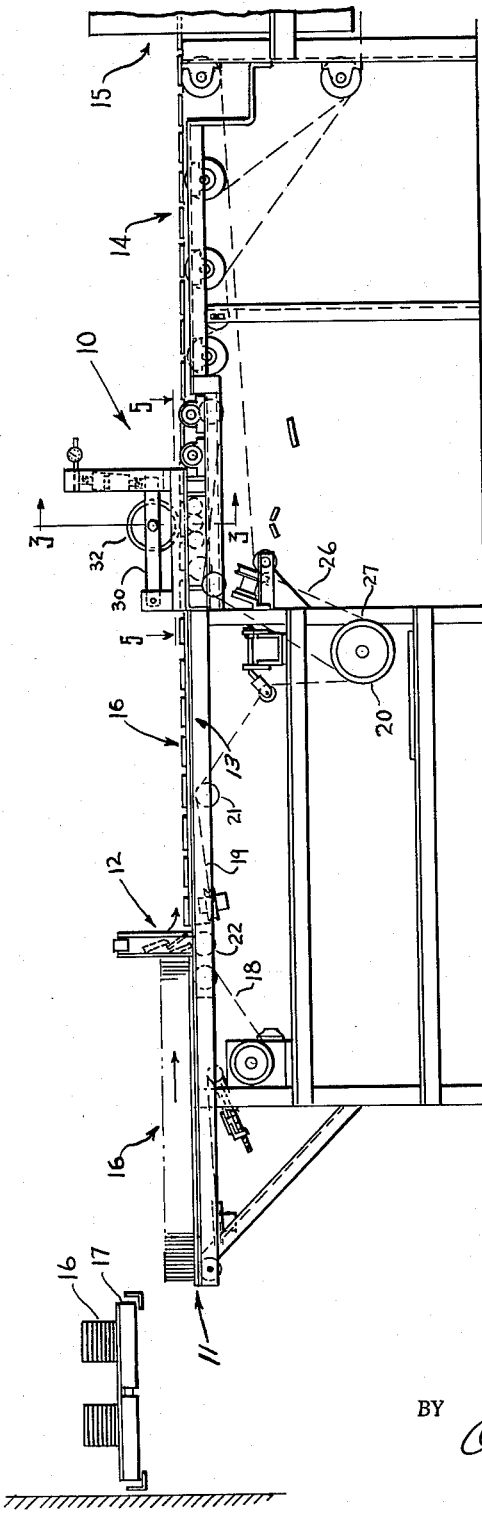
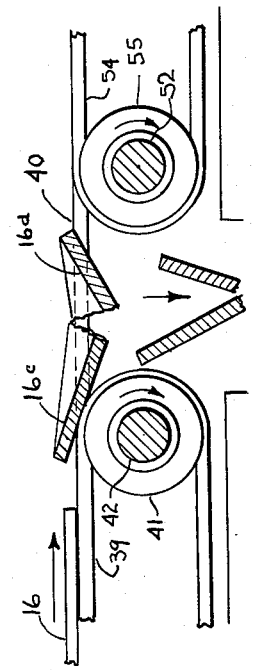
Howard D. Mays
Karl M. Claus
William A. Ser Vaas
INVENTORS
BY
ATTORNEYS July 4, 1961 H. D. MAYS ET AL 2,990,953
MACHINE FOR DETECTING CRACKED CERAMIC TILES
Filed Oct. 21, 1958 3 Sheets-Sheet 2

Howard D. Mays
Karl M. Claus
William A. SerVaas
INVENTORS

BY Owen & Owen
ATTORNEYS

United States Patent Office 2,990,953
Patented July 4, 1961

2,990,953
MACHINE FOR DETECTING CRACKED CERAMIC TILES
Howard D. Mays and Karl M. Claus, Zanesville, Ohio, and William A. Ser Vaas, Indianapolis, Ind., assignors to The Mosaic Tile Company, Zanesville, Ohio, a corporation of Ohio
Filed Oct. 21, 1958, Ser. No. 768,649
8 Claims. (Cl. 209—79)

This invention relates to a machine for automatically detecting cracked ceramic tiles and for rejecting such tiles, thereby eliminating them from the manufacturing process and achieving savings by obviating their being put through subsequent manufacturing steps.

In the manufacture of flat ceramic tiles, such as the type used for walls of bathrooms, swimming pools, gymnasiums, etc., there are two general processes. One of these processes includes two firing steps. The bodies of the tiles are formed by compacting or pressing ground clays and binders and these "green goods" biscuits are fired to fuse the main tile bodies. The tile is then given a coating of a high temperature glaze and the pre-fired body with the glaze is fired in a second furnace at a higher temperature to fuse the hard, glossy, glaze coating. Another process includes only a single firing. The tile blanks or green goods as formed by compressing the clay and other ingredients and then a glazing substance is spread over the surface of these green goods. The coated bodies are then fired a single time to fuse both the bodies and the glaze. Many advantages in control and protection in manufacture are achieved by the use of the two-firing process.

In a two-firing process it frequently occurs that during the handling of the green goods or the initially fired bodies, the tiles may be slightly cracked and the cracks may be so minute as to not show up during the application of the glaze or the firing of the glaze. Since the cost of the glaze as a raw material is quite high, and because the firing step for the glaze is an expensive step, it would be preferable, if possible, to avoid the glazing and firing of any tiles whose cracks would subsequently cause them to be rejected by inspection or would result in imperfect tiles being glazed and shipped out of the factory.

Discovery of the cracks in either the fired biscuits or in the glazed tiles requires a careful visual inspection. This inspection step is also costly, so that if cracked tiles are put through the entire manufacturing process a substantial loss occurs not only in the cost of the glazing material itself and in the firing of that glaze, but also in the additional inspection which must be made.

Although the present invention has its greater utility in a two-firing process because it obviates the waste of glazing, firing the glaze, handling and inspecting previously cracked tiles, it also has utility in a single firing process. In a single firing process, mechanism embodying the invention is utilized to detect and reject cracked finished tiles thereby eliminating from further handling and inspection all tiles which are cracked.

It is, therefore, the principal object of this invention to provide a machine which will automatically detect cracked tiles.

It is another object of this invention to provide a high speed machine which will automatically feed fired tile bodies, automatically detecting cracks in such bodies whether they extend in one direction or in a transverse direction and automatically discarding those tiles found to have cracks.

It is yet another object of this invention to provide a machine particularly suited for the detection and rejection of initially fired tile bodies before the subsequent glazing and glaze firing steps, thereby to eliminate otherwise wasted material and labor and substantially reduce costs.

There is another indirect object and advantage from the present invention in a ceramic tile factory. Because the machine quite readily detects and discards cracked tiles, operators of various presses and kilns will shortly become aware of the percentage of the tile prepared on their presses or in their kilns which are being detected as being cracked and thus being discarded by the machine. The knowledge that a certain percentage of the tiles produced by any press or in any kiln is defective, acts as a powerful stimulant to the operators of these machines to improve their methods and their operations so as to reduce the percentage of cracked tiles which stem from their operations. In actual experience it has been found that this psychological factor has actually caused a reduction of from, say, five to six percent cracked tile from a single press or battery of presses or from a first-firing kiln, to as low as one-half of one percent. The fact that the machine invariably detects the cracked tile and rejects it constitutes irrefutable proof to the operators of these presses and kilns that their work is faulty and is causing tiles to be cracked during handling. In their anxiety to improve their own work and to better their reputations as operators, they improve their techniques and the substantial decrease in faulty tiles inevitably results.

Other objects and advantages of the machine embodying the instant invention will be better understood from the specification which follows, and by reference to the drawings, in which:

FIG. 1 is a view in elevation and on a somewhat small scale of a cracked tile detector embodying the invention as equipped with individual tile feeding means and with sub-combinations for detecting cracks in tiles extending both parallelly to the direction of heating of the tiles and transversely thereto.

Figure 5:
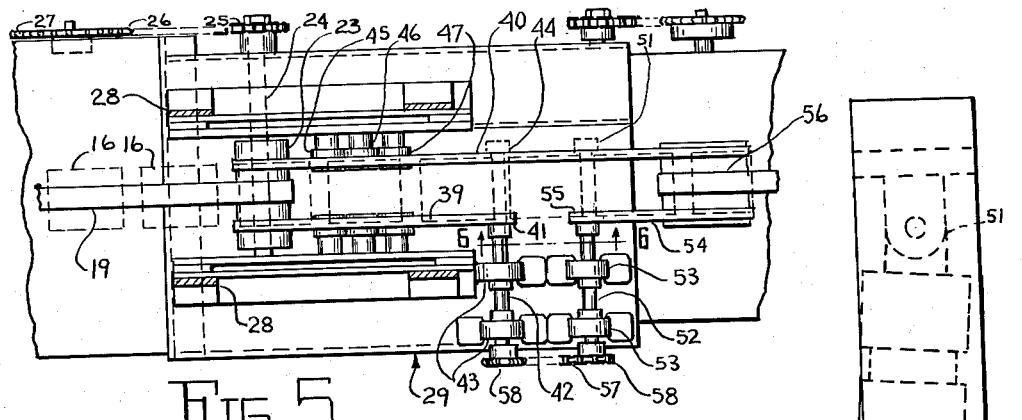

FIG. 5 is a fragmentary, horizontal plan view taken generally from the position indicated by the line 5—5 in FIG. 1 and showing the relationships of driving, feeding and rejecting belts and in particular the mechanism for rejecting a tile which is cracked transversely to the direction of feeding thereof, and FIG. 6 is a fragmentary, vertical sectional view, on an enlarged scale, taken along the lines 6—6 of FIG. 5 and illustrating how a tile cracked transversely to the direction of feeding is rejected by a mechanism embodying the invention.

A cracked tile detecting and rejecting apparatus embodying the invention is generally indicated by the reference number 10. The mechanism 10 is mounted in a feeding pathway which includes a stacking table generally indicated at 11, a release gate generally indicated at 12, a feeding table generally indicated at 13, and a delivery table generally indicated at 14 which carries the tiles into a glaze applicator and firing apparatus fragmentarily shown at 15.

Stacks of tile bodies 16 are delivered to the vicinity of the crack tile detecting and rejecting mechanism 10, for example, by a conveyor 17 which leads from the kilns in which the tile bodies are fired. An operator removes the stacks of tile bodies 16 from the conveyor 17 and places them on edge on the stacking table 11. The main surface of the stacking table 11 is formed by a wide, slow speed belt which moves in the direction of the arrow shown in FIG. 1 to gradually feed the tile bodies 16 forwardly toward the individual tile feeding table 13. The operator stacks the tile bodies 16 on edge and they are released one by one as the upper edge of each engages the release gate 12 and the lower edge of each engages a high speed belt 19.

Figure 2:
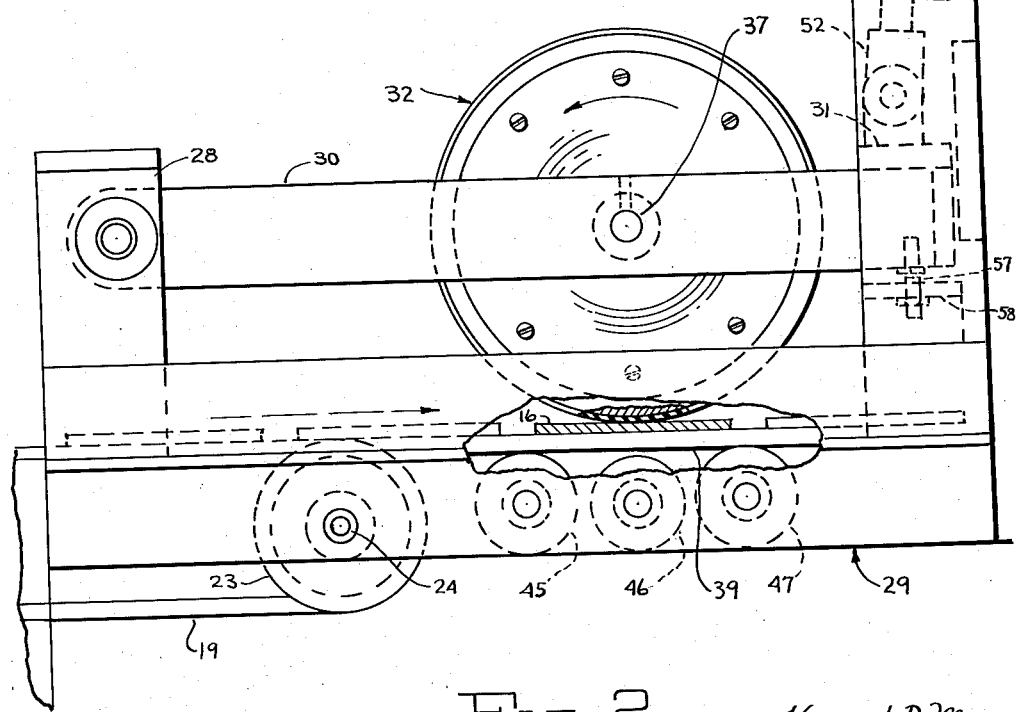
FIG. 2 is a fragmentary, greatly enlarged view, in side elevation, of a portion of the cracked tile detector, certain parts being broken away, by which the actual presence of cracks in the bodies of the tiles themselves is detected.
Figure 3:
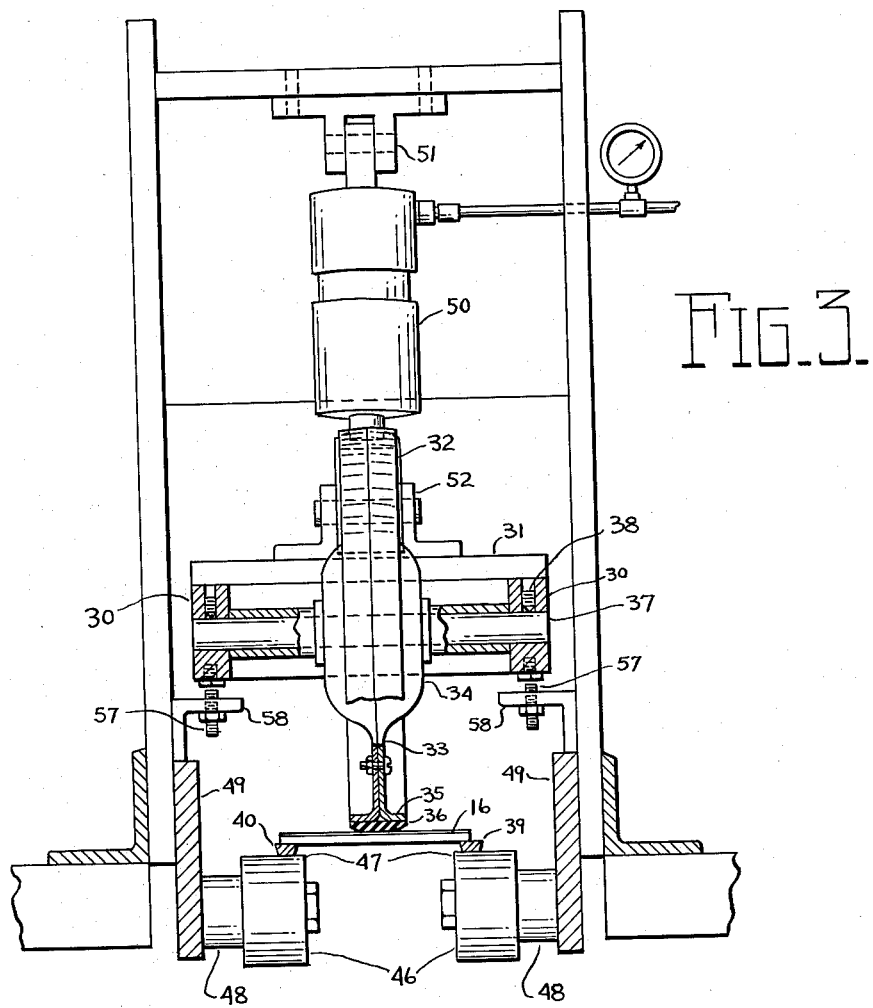
FIG. 3 is a vertical, sectional view taken along the line 3—3 of FIG. 1, and shown on a substantially larger scale.

The high speed belt 19 (see also FIGS. 2 and 5) feeds the tile bodies 16 longitudinally along the feeding table 13 and toward the detecting and rejecting mechanism 10. The high speed belt 19 is engaged with a drive drum, generally indicated at 20 in FIG. 1, and runs over suitable idler drums 21 and 22 in FIG. 1 and a return drum 23 (see also FIGS. 2 and 5). The return drum 23 is mounted upon a shaft 24 on the rear end of which there is pinned or otherwise secured a drive sprocket 25. The sprocket 25 is engaged by a drive chain 26 (see also FIG. 1) which is also engaged with a large drive sprocket 27. The delivery end of the high speed belt 19, which is engaged with the return drum 23, is located between a pair of transversely spaced posts 28 erected upon a horizontally extending framework 29. The two posts 28 serve as pivotal supports for the rear ends of a pair of laterally spaced arms 30 (see also FIG. 3). The forward ends of the arms 30 are connected by a horizontal cross bar 31, the arms 30 and the cross bar 31 serving as a yoke for rotatably supporting a pressure roller generally indicated at 32. The pressure roller 32 comprises a web 33, a hub section 34, and a rim 35 upon which there is mounted a rubber tire 36. The pressure roller 32 is journaled on a shaft 37 which is in turn mounted in aligned holes in the arms 30 and held in place therein by set screws 38.

The return drum 23 (see FIGS. 2 and 5) also serves as a driving drum for a pair of parallelly extending laterally spaced V-belts 39 and 40. The belt 39 is also engaged in a V-belt pulley 41 (see FIGS. 5 and 6) which is mounted upon a jack shaft 42 rotatably journaled in a pair of pillows 43 and extending parallelly to and spaced from the shaft 24. The belt 40 is engaged with the return drum 23 and extends forwardly parallelly to the belt 39 running on but not around a V-belt pulley 44 which is pinned on the rear end of the jack shaft 42. By this arrangement the two belts 39 and 40 are driven at the same lineal speed, with their upper spans moving in the same direction as the high speed feeding belt 19, but the two belts 39 and 40 are spaced transversely from each other a distance such that one of the tile bodies 16 spans the lateral distance between the belts (see particularly FIG. 3).

Three pairs of belt support rollers 45, 46 and 47 are journaled on horizontal stub axles 48 which are in turn supported by horizontally extending frame bars 49 of the framework 29. As can best be seen by reference to FIGS. 2 and 3, the axes of the pairs of belt support rollers 45 and 47 are not only parallel to each other but are located at the same horizontal level with the surfaces of the rollers 45 and 47 lying in the plane of travel of the bottom surfaces of the spaced belts 40 and 39. The axes of the aligned rollers 46 are parallel to the axes of the rollers 45 and 47 but are located at a lower level. Therefore, the surfaces of the rollers 46 do not ordinarily contact the under surfaces of the two spaced belts 39 and 40.

The pressure roller 32 is urged downwardly by the pressure exerted in an air cylinder 50, the upper end of the cylinder 50 being yoked in a pintle 51 and its rod being connected to a similar pintle 52 carried by the cross bar 31. Air under a specified pressure is maintained in the cylinder 50 and thus the pressure roller 32 and its framework is urged downwardly with a predetermined force. The force with which the pressure roller 32 is urged downwardly is determined by measurement of the force required to cause one of the tile bodies 16 to break when that tile body has already been cracked during previous handling to such an extent that it would not and could not be expected to stand up under subsequent handling or use. The exact force with which the pressure roller 32 should be urged downwardly depends, of course, upon the precise material from which the tile bodies are fabricated, their firing and other factors impossible to predict with respect to any particular weight, size or thickness of ceramic tile body. However, the force with which the pressure roller 32 must be urged downwardly can readily be determined by feeding tiles known to possess cracks of the objectionable type through a machine embodying the invention and increasing the air pressure acting upon the pressure roller 32 until it invariably cracks the faulty tiles. Conversely, the pressure acting on the pressure roller 32 may be increased to such an extent that the roller actually causes the cracking of unblemished tiles and then the pressure may be reduced a degree sufficient so that unblemished tiles will pass beneath the pressure roller 32 without damage.

As each tile is fed off of the high speed center belt 19 and onto the spaced belts 39 and 40, it spans the two parallel webs of the belts 39 and 40 (see FIG. 3) and is carried by these belts across above the lower set of belt support rollers 46. In the event that the tile passing beneath the pressure roller 32 is defective, the force exerted on the pressure roller 32 by the air cylinder 50 will cause the tile to crack. If the crack extends longitudinally, the roller 32 moves the center of the tile downwardly while its longitudinal edges are supported by the belts 39 and 40 supported at its corners by the rollers 45 and 47. If the crack extends transversely, the center of the tile moves downwardly, depressing the belts 39 and 40 into contact with the lower set of support rollers 46. If the lower belt support rollers 46 lay in the same plane as the rollers 45 and 47, the belts 39 and 40 would not deflect when the tile cracked across its body and transverse cracks could not be detected.

Figure 4:
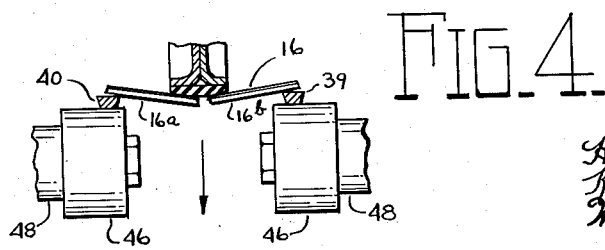
FIG. 4 is a fragmentary, vertical sectional view of a portion of the mechanism shown in FIG. 3, and illustrating how a tile which is cracked longitudinally of the direction of its feeding is rejected by a mechanism embodying the invention.

FIG. 4 illustrates how a tile which is cracked longitudinally of its direction of movement is caused to break by the pressure exerted by the pressure roller 32, as it is thrust downwardly. In FIGURE 4 a ceramic tile body indicated at 16 is shown as being cracked into two halves 16a and 16b which, after cracking, are thrust downwardly through the space between the sets of rollers 46 as a rejected tile.

Referring now particularly to FIGS. 5 and 6, it will be seen that the V-belt 40 runs not only on the pulley 44 on the jack shaft 42, but also runs on the upper surface of a similar pulley 51 which is pinned on the rear surface of a second jack shaft 52 journaled by pillows 53 with its axis of rotation parallel to and spaced from the jack shaft 42. The belt 40 is continuous and spans the space between the pulleys 44 and 51 on their respective shafts 42 and 52.

A third V-belt 54 is engaged in a V-belt pulley 55 also carried by the jack shaft 52 in alignment with the V-belt 39.

The two jack shafts 52 and 52 are longitudinally spaced from each other such a distance that the open space between the V-belts 39 and 54 can be spanned by an unbroken tile body but is too great to be spanned by a transversely cracked tile body 16. As each of the tile bodies 16 is fed outwardly from beneath the pressure roller 32 on the belts 39 and 40, it arrives at the gap between the V-belts 39 and 54. If the tile body 16 has been transversely cracked by the pressure roller 32, the two parts (see FIG. 6), such as the parts indicated by the reference numbers 16c and 16d, are too small to span the open gap between the ends of the belts 39 and 40 and the broken tile body 16, i.e., its two parts 16c and 16d, fall downwardly through the space between the ends of the belts 39 and 54 as a rejected tile.

Those tile bodies 16 which pass beneath the pressure roller 32 without being broken, i.e., those tile bodies 16 which are not cracked, pass over the gap between the belts 39 and 54 and are thereafter picked up and carried by the belts 40 and 54 until they are engaged with a second central feeding belt 56 (see FIG. 5) which conveys them onwardly over the delivery table 14 and into the entrance side, for example, of glaze applying mechanism 15 and then into a suitable firing furnace or into conveyors for carrying them to a glaze firing kiln.

The two jack shafts 42 and 52 may be driven, for example, in synchronism by a drive chain 57 (FIGS. 1 and 5) engaged with sprockets 58 on the ends of the shafts 42 and 52 and with other sprockets, both idler and drive.

In order to prevent the pressure roller 32 from being driven downwardly into the space between the pairs of belt support rollers 45, 46 and 47, adjustable stops 57 (see FIGS 2 and 3) are mounted in brackets 58 and are aligned with the ends of the pressure roller support arms 30. The stops 58 are so adjusted as to permit sufficient downward movement of the pressure roller 32 to finish breaking and cracked tile but insufficient movement to allow the pressure roller 32 to drop to a position where a following undamaged tile body 16 would fail to raise the pressure roller 32 to the position shown in FIG. 2.

It will be appreciated, of course, that the particular spacing and sizes of the portions of the above described mechanism will be determined by the sizes of the tile bodies under test. For purposes of illustration in this specification and in the attached drawings, it has been presumed that the tile bodies under test are generally of the size of four by four inches and approximately one-quarter inch thick. Larger or smaller tile bodies to be tested will, of course, require compensatory increases or decreases in the sizes of the several mechanisms and the spacing between the various belts.

We claim:

1. Apparatus for detecting and rejecting cracked, generally planar thin bodies, said apparatus comprising means for feeding said bodies along a longitudinal path, means for supporting only the corners of each of said bodies at one location in said path, means for acting on each of said bodies as it reaches such location for exerting a predetermined pressure on the central part of said body in a direction generally normal to its surface for pressing said body against said corner supporting means for breaking previously weakened cracked bodies, and means for feeding only unbroken bodies out of said apparatus.

2. Apparatus according to claim 1 in which said means for feeding said bodies comprises a pair of laterally spaced longitudinally extending belts bridgable by said bodies and said belts are supported at four points spaced to lie beneath the four corners of said bodies when said bodies are subjected to such predetermined pressure.

3. Apparatus according to claim 2 in which the space between said belts at their location of corner support is open for discard of longitudinally cracked bodies.

4. Apparatus according to claim 1 in which said longitudinal path is interrupted at at least one side with a space across which said feeding means will feed an unbroken body but across which a transversely broken body will not be fed by said feeding means.

5. Apparatus for detecting and rejecting cracked tile bodies, said apparatus comprising a pair of parallel, horizontal feeding belts laterally spaced a distance less than the expected lateral dimension of said tile bodies for feeding said bodies and supporting said bodies along their longitudinal edges, at least four belt support rollers mounted to support said belts at a testing position at points on said belts spaced to lie beneath the corners of a tile body in testing position, means for applying a measured force to the center of each tile body in testing position for breaking a previously cracked body and a longitudinal gap in at least one of said feeding belts at a rejection position, said gap being of sufficient length so as to provide for the discharge of a broken tile body therethrough.

6. Apparatus according to claim 5 in which the means for applying a measured force is a downwardly urged pressure roller mounted on a horizontal axis transverse to the direction of feed of said belts and with its surface located to contact said tile bodies at said testing position.

7. Apparatus for detecting and rejecting cracked bodies, all of said bodies being generally planar and having the same horizontal dimensions, said apparatus comprising a pair of laterally spaced parallel feeding belts movable longitudinally with their upper surfaces lying in the same general plane, means for feeding said bodies serially onto said belts, a pressure roller having a periphery of axial width less than the distance between said belts, means for journalling said roller on a horizontal axis transverse to the direction of movement of said belts and with its rim positioned between said belts, means for urging said roller downwardly with a predetermined constant pressure against the upper faces of said bodies, belt support means laterally spaced relative to the body contacting rim of said pressure roller for supporting said bodies at their four corners when said bodies are beneath said roller, one of said belts continuing to the end of said apparatus and the other of said belts extending parallel to said first belt but not to the end of said apparatus, and a third belt mounted with its upper surface longitudinally aligned with the end of said second belt and longitudinally spaced therefrom a distance such as to provide for the discharge of a broken tile body therethrough.

8. Apparatus according to claim 7 and means for consecutively feeding individual bodies onto said feeding belts.

References Cited in the file of this patent

UNITED STATES PATENTS

| | | |
|---|---|---|
| 299,694 | Stetson | June 3, 1884 |
| 2,515,392 | Barber | July 18, 1950 |
| 2,670,624 | Paris | March 2, 1954 |
| 2,736,431 | Coleman et al. | Feb. 28, 1956 |
| 2,891,667 | Truver | June 23, 1959 |